United States Patent [19]
Storz

[11] Patent Number: 6,082,479
[45] Date of Patent: Jul. 4, 2000

[54] WHEEL MOUNTING MEMBERS AND AXLE COVERS FOR A MOTORCYCLE

[76] Inventor: Stephen H. Storz, 239 S. Olive St., Ventura, Calif. 93001

[21] Appl. No.: 09/200,504

[22] Filed: Nov. 25, 1998

[51] Int. Cl.[7] .................................................. B62D 61/02
[52] U.S. Cl. ........................................... 180/219; 180/219
[58] Field of Search .................................. 280/219, 217, 280/152.1, 157, 288, 279; 180/219; 301/37.1, 37.24, 37.32, 37.33, 108.1, 108.3

[56] References Cited

U.S. PATENT DOCUMENTS

| | | | |
|---|---|---|---|
| 3,924,898 | 12/1975 | Kain | 301/108 |
| 4,744,606 | 5/1988 | Yoshida | 301/6 |
| 4,967,867 | 11/1990 | Fuller | 180/219 |
| 5,775,454 | 7/1998 | Scherbarth et al. | 180/219 |
| 5,881,835 | 3/1999 | Lucht et al. | 180/219 |

*Primary Examiner*—Lanna Mai
*Assistant Examiner*—Kevin McKinley
*Attorney, Agent, or Firm*—Jackson Walker LLP

[57] ABSTRACT

A wheel axle cover system for engagement with a motorcycle suspension fork front end, including wheel axle cover for engaging the walls of either the front suspension fork end or the axle in such a fashion to conceal the axle end from view.

9 Claims, 9 Drawing Sheets

WHEEL MOUNTING MEMBERS AND AXLE COVERS FOR A MOTORCYCLE

BACKGROUND OF THE INVENTION

1. Field of the Invention

Applicant's invention relates to front wheel axle covers and wheel mounting members for a motorcycle.

2. Background Information

A motorcycle front wheel is mounted on an axle which is secured on each end at a wheel mounting member located on the lower ends of the front fork. The axle has on one end an enlarged member and, on the other end, is threaded for receipt of a washer and nut. The axle is slid through an axle bore in the wheel mounting members and stops with the engagement of the enlarged member against a spacer or the wheel hub itself. The other end of the axle is engaged to the wheel mounting member by the nut and washer. Pinch bolts on either or both wheel mounts radially compress the inner surface of the axle bore against the axle to secure it in place.

A need exists to cover the ends of the axle bores so as to hide from view the axle ends to create an aesthetically pleasing front end as well as to prevent debris from entering the axle bore or engaging the removed ends of the axle.

Applicant has provided wheel mounting members and wheel axle covers to hide the ends of the axle from view and create an aesthetically pleasing appearance to the front end of the motorcycle. The axle wheel covers also help prevent debris from accumulating on the axle ends and the axle bore.

A need exists for axle wheel covers that are easily removable from the wheel mounting members. Applicant has provided wheel mounting members with wheel axle covers which engage the axle bore of the wheel mounting members in an easily removable fashion.

A need also exists for axle wheel covers that engage either the axle bore or the axle itself in a flush or non-flush engagement with the outer surface of the wheel mounting members in an easily removable manner so as to hide the ends of the axle from view and present a pleasing appearance.

Applicant provides such a wheel cover having an engagement member flush with the walls adjacent the axle bore and an axle wheel cover with walls engaging the walls of the wheel mounting members which are adjacent wheel cover axle bore in a flush non-flush manner.

DETAILED DESCRIPTION OF THE PREFERRED EMBODIMENT

Figure 1A:
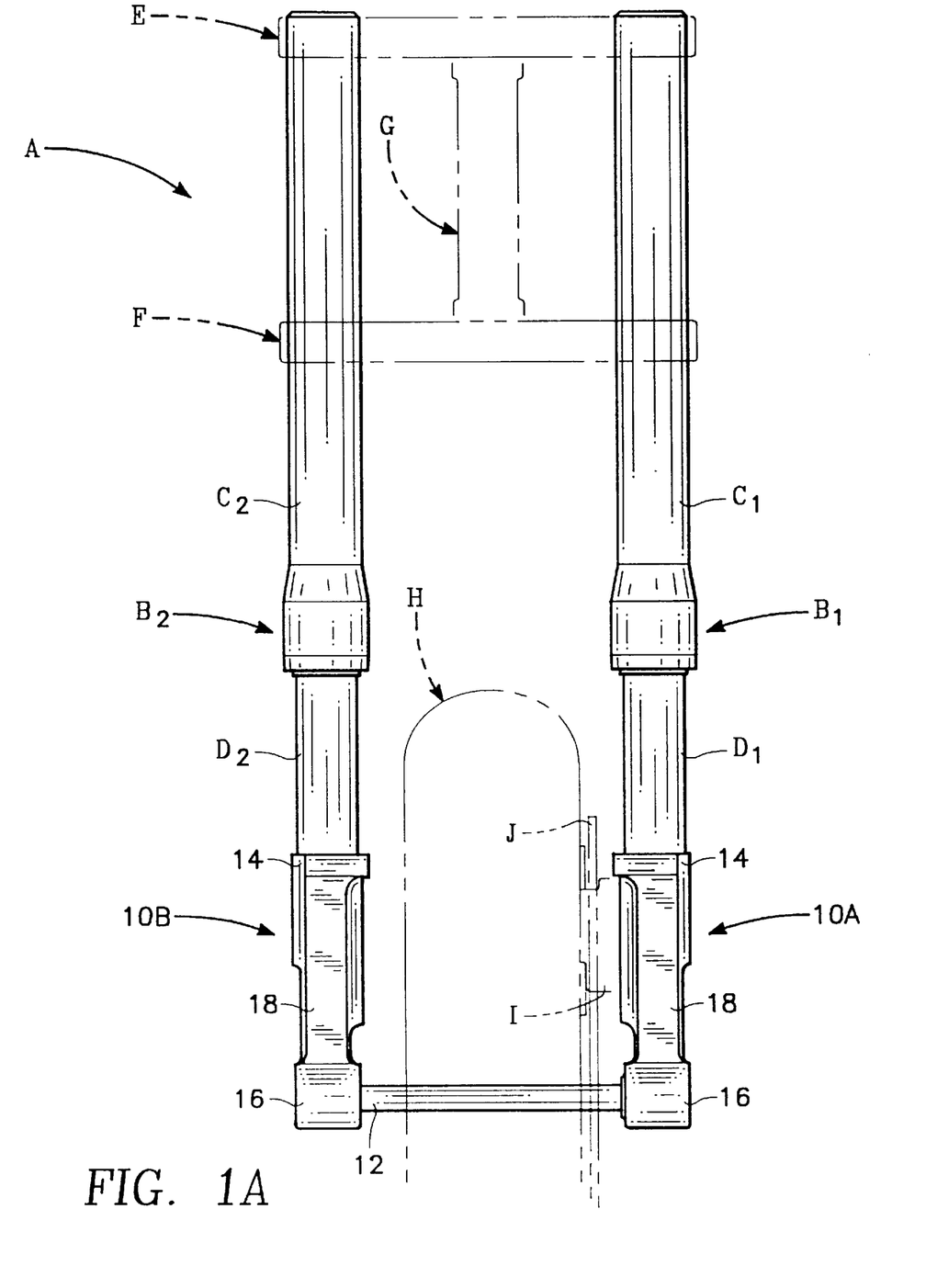
FIG. 1A is a front elevational view of the front suspension of the motorcycle, including Applicant's lower leg and wheel mounting members.
Figure 1B:
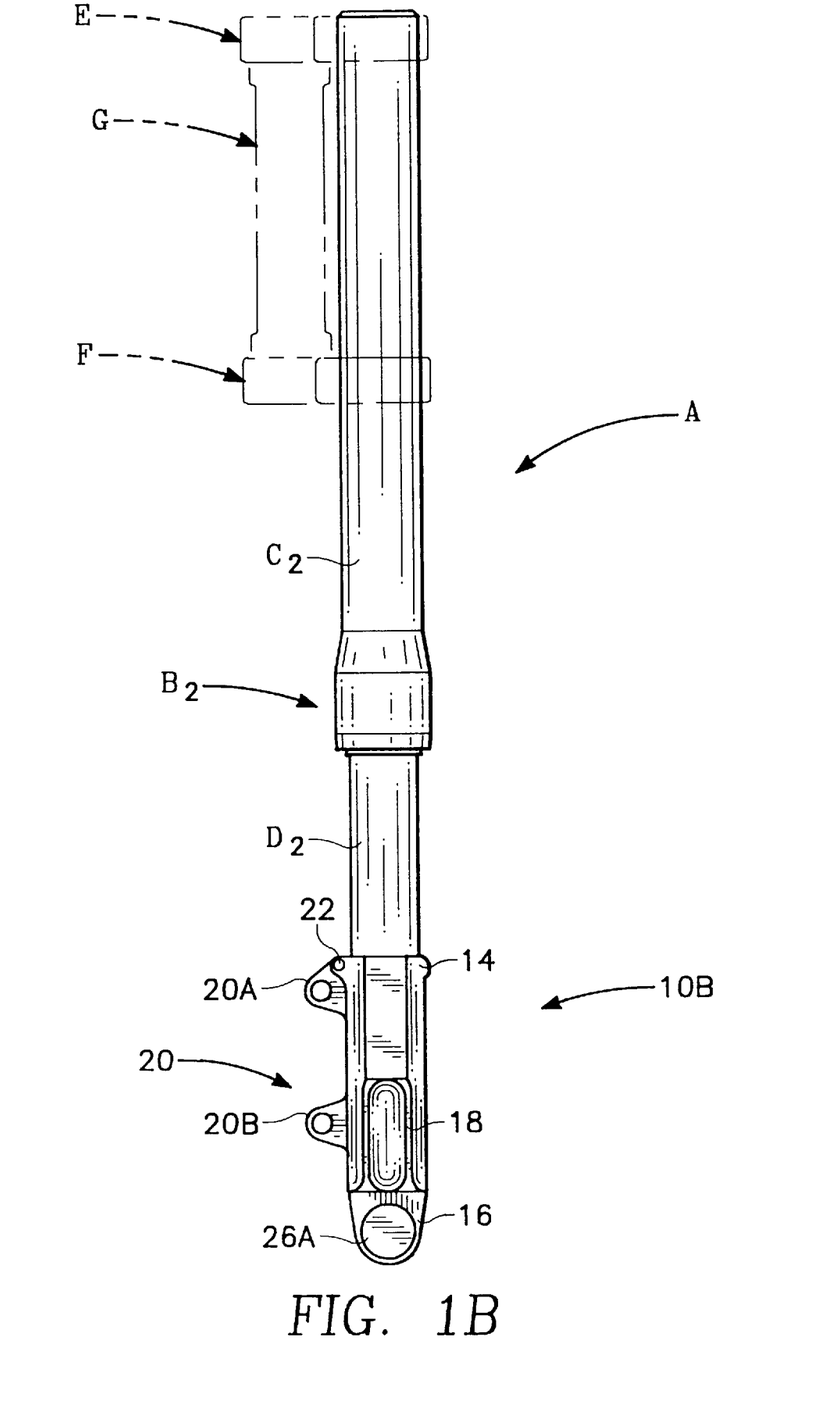
FIG. 1B is a right side (rider's view) of the front suspension of the motorcycle, with Applicant's right fork tube assembly, including the wheel mounting member.
Figure 1C:
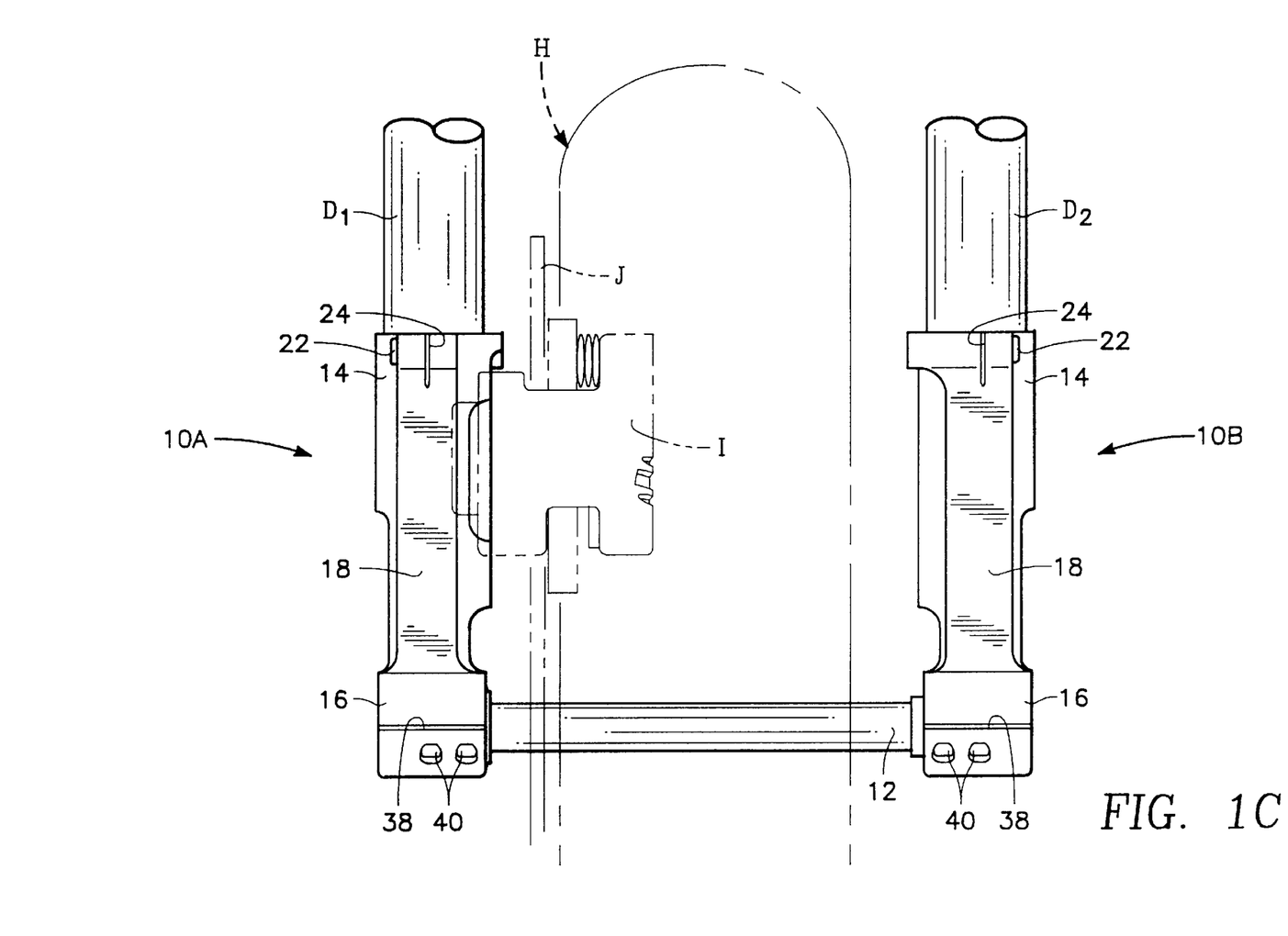
FIG. 1C is a rear elevational view of the lower legs and wheel mounting members of Applicant's present invention illustrating the axle with wheel attached thereto, and disc brake caliper attached to one of the wheel mounting members, for acting on the disc on the wheel to provide braking therefor.
Figure 2A:
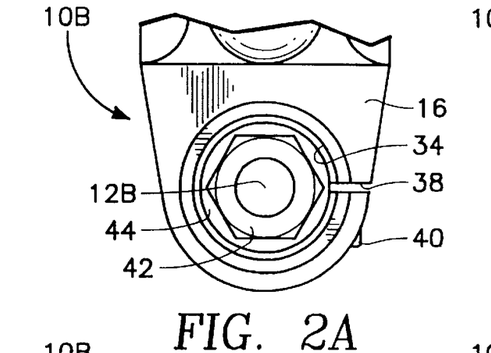
FIG. 2A is a front left wheel mount and right side elevational view with the axle cover removed therefrom, but with the axle in place.
Figure 2B:
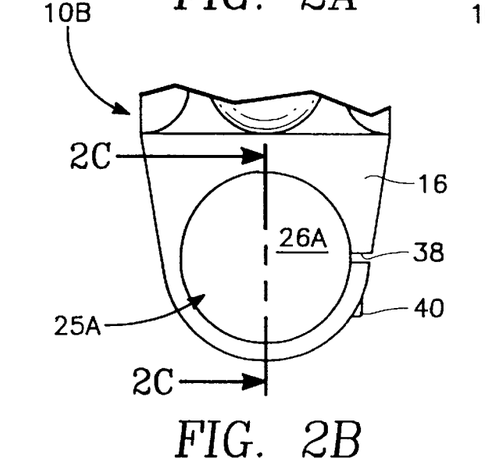
FIG. 2B is a front left wheel mount and right side elevational view with the axle cover engaged therewith.
Figure 2C:
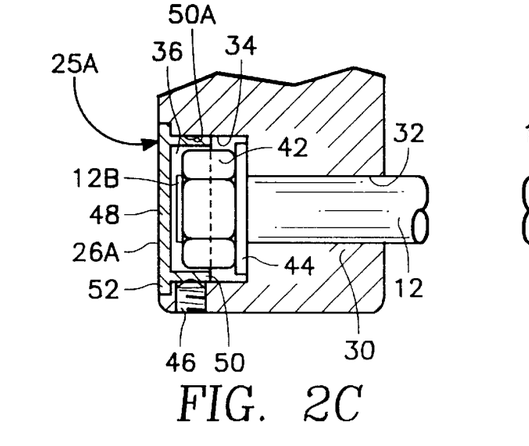
FIG. 2C is a cut-away side elevational view of FIG. 2B.
Figure 3A:
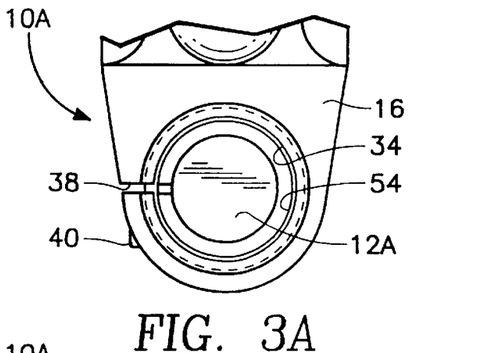
FIG. 3A is a front right wheel mount port end and left side elevational view with the axle cover removed therefrom, but with the axle in place.
Figure 3B:
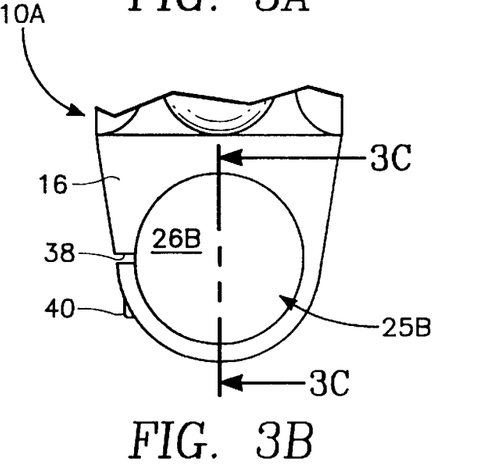
FIG. 3B is a front right wheel mount and left side elevational view with the axle cover engaged therewith.
Figure 3C:
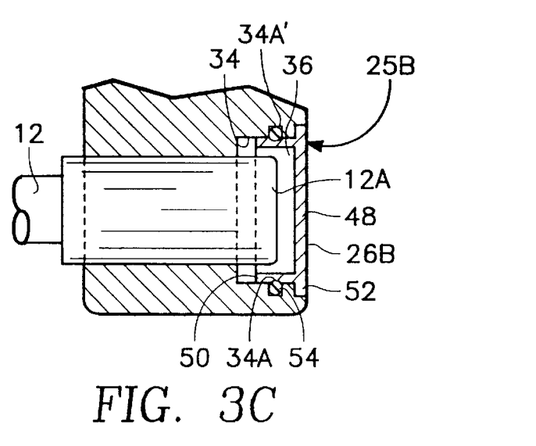
FIG. 3C is a cut-away side elevational view of FIG. 3B.

FIGS. 1A, 1B, and 1C illustrate elevational views of the front suspension of the motorcycle, including Applicant's unique wheel mounting members and axle wheel covers. The use of right and left in these specifications are rider's view of the right and left. Therefore, for example, FIG. 1A discloses the front suspension of a motorcycle, including a front suspension unit A comprising a left fork leg assembly B1 and a right fork leg assembly B2, a left upper fork tube C1, and a right upper fork tube C2, a lower left fork tube D1 and a lower right fork tube D2.

The two fork leg assemblies B1 and B2 are secured to the motorcycle through engagement with an upper triple clamp E and a lower triple clamp F, which triple clamp rotatably engages a motorcycle steering head G. The front suspension unit A provides mounting points for a tire and wheel assembly H (through engagement with an axle as set forth in more detail below), one (or a pair of) brake caliper(s) I, and one (or a pair of) wheel mounted brake disc(s) J, and, sometimes, a speedometer drive K.

FIGS. 1A through 1C also illustrate Applicant's unique wheel mounting members and axle cover, here left front fork leg wheel mounting member 10A and right front fork leg wheel mounting member 10B, hereinafter called left front or right front wheel mounting members. As can be appreciated with reference to the figures, Applicant's front wheel mounting members are located at the removed ends of front suspension unit A. More specifically, the left front wheel mounting member 10A is found at the removed end of left fork leg assembly B1 and right front fork leg wheel mounting member found at the removed end of right fork leg assembly B2.

Applicant's wheel mounting members provide front wheel attachment through engagement with a rigid axle 12, the axle having a right end 12A and a left end 12B (see FIGS. 2 and 3), the axle being held near its ends in the two wheel mounting members in a manner set forth in more detail below.

Applicant's wheel mounting members 10A and 10B are seen to be generally longitudinal, and are typically made from machined, cast, or forged aluminum or steel or other appropriate material. The wheel mounting members have, at an upper end thereof, fork tube receiving ends 14 for receipt of lower left fork tube D1 and lower right fork tube D2 thereinto in a fashion to rigidly secure the wheel mounting members to the fork tubes as set forth in more detail below. Opposite the fork tube receiving ends of the wheel mounting members are located the axle receiving ends 16 of the wheel mounting members. Between these two ends is a body 18 of the wheel mounting members.

Applicant's wheel mounting members are also adapted to locate and attach brake calipers thereon by having brake caliper mounting arms 20, the brake caliper mounting arms including upper brake caliper mounting tab 20A and lower brake caliper mounting tab 20B. Some motorcycles may use only a single brake caliper and disc and, therefore, the use of brake caliper mounting arms for on the other wheel mounting members is optional. Applicant's unique brake caliper mounting arms 20 are dimensioned for direct receipt of stock Harley Davidson brake calipers thereon and the upper and lower brake caliper mounting tabs are located a distance apart (center to center), with brake caliper mounting holes for receipt of the stock Harley Davidson brake caliper and fasteners thereinto.

Applicant's wheel mounting members receive the lower fork tubes at the wheel mount receiving end 14 and are secured to same through the use of a pinch bolt threaded into a pinch bolt hole 22 which, when the pinch bolt is threaded tightly, will slightly compress the receiving end 14 across a pinch bolt slot 24. The lower fork tubes are also threaded into the mount receiving end 14.

Still with reference to FIGS. 1A through 1C, and with additional reference to FIGS. 2A, 2B, 2C, 3A, 3B, 3C, 4A, 4B, and 5, it is seen that Applicant provides unique axle cover means including a right axle cover 25A and a left axle cover 25B. The right axle cover includes a right axle cover outer surface 26A and the left axle cover includes a left axle cover outer surface 26B.

The use of the axle covers will be understood by reference to the structure and engagement with the wheel mounting members. More specifically, it is seen that Applicant's wheel mounting members include walls 30 defining an axle bore 32, the bore extending longitudinally and transverse to the longitudinal axis of the wheel mounting members. The axle bore is dimensioned to snugly receive the cylindrical axle thereinto. Further, Applicant provides for, in at least one of its wheel mounting members, walls 34 defining an axle end receiving chamber 36. It is seen with reference to FIGS. 2A through 2C, and 3A through 3C that one of the two wheel mounting members may include, on the walls defining the axle end chamber, an o-ring groove 34A (See FIG. 3C), and the other may contain a set screw groove 50A (See FIG. 2C). Further, it is seen that Applicant's wheel mounting members provide, on each member thereof, an axle pinch bolt slot 38 and (typically) a pair of axle pinch bolts 40 to threadably engage the member through the slot so that, when the axle pinch bolts 40 are tightened down, with the axle in place, they provide compression circumferentially around the outer surface of the axle to help hold it in place.

An axle nut 42 and an axle washer 44 are placed over a removed end of the axle when the axle is in place to secure the axle longitudinally within the axle bore. It is seen that the washer and nut engage the walls of the axle and axle chamber as well as the axle itself to attach the front wheel longitudinally to the left wheel mount to prevent the axle from sliding in the bore. The opposite end of the axle is held in place through engagement with a spacer 56 (see FIG. 5) or the wheel hub.

Turning now to the details of the wheel cover disclosed, it is seen that Applicant's invention includes an axle cover having a disc-shaped face 48 which is integral with a cylindrical ring 50. Each base includes an outer surface 26A and 26B. The cylindrical ring 50 comes off the inner surface of the base in a manner to engage the walls 34 of axle in chamber 36, as set forth in more detail below.

Figure 4A:
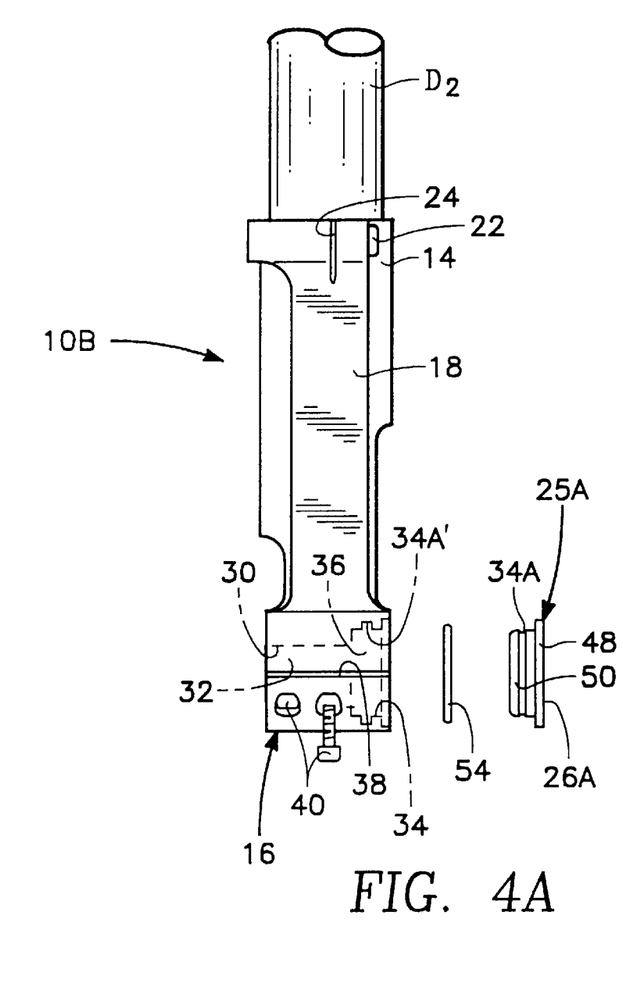
FIG. 4A is a right rear elevational view of the lower fork tube and wheel mounting members of Applicant's present invention, with the axle cover removed therefrom, and not showing the axle.
Figure 4B:
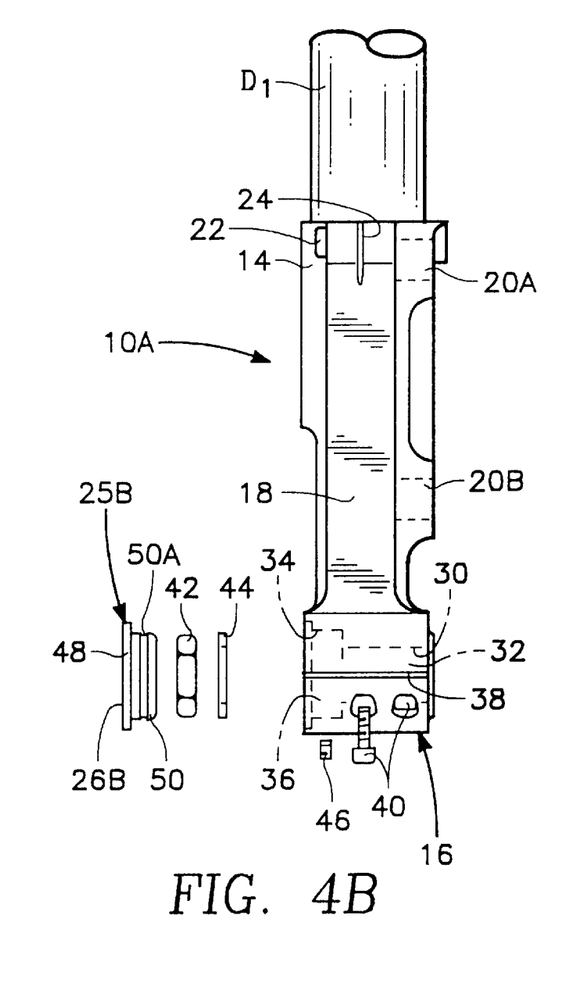
FIG. 4B is a left rear elevational view of the lower fork tube and wheel mounting member of Applicant's present invention, with the axle cover removed therefrom, and not showing the axle.
Figure 5:
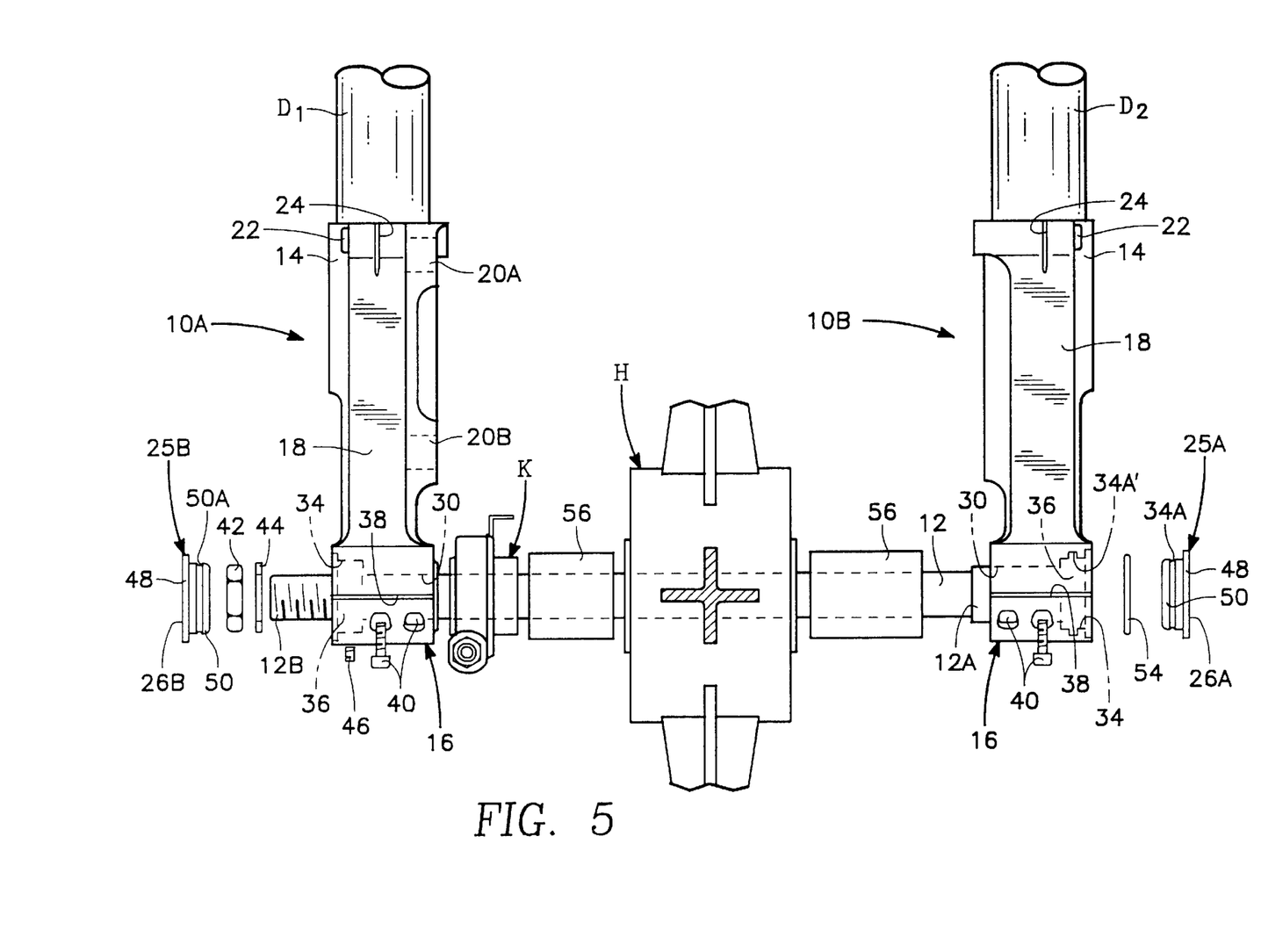
FIG. 5 is a rear elevational view of the fork leg assembly of Applicant's present invention, showing the axle, axle nut and wheel cover exploded therefrom, with the wheel installed on the axle.

It is seen with reference to FIGS. 4A and 4B, as well as FIG. 5, that the ring that stands off the inside surface of the base of the axle covers is modified. One axle cover includes a groove 34A for placement of an o-ring therein, and another axle cover includes a groove 50A for receipt of a set screw thereagainst. Further, the walls of the axle end chamber are grooved for receipt of the o-ring therein on one of the wheel mounting members. Walls of the axle end chamber are greater than the diameter of the body of the axle and are just slightly greater in diameter than the diameter of ring 50 of the axle cover 25a to allow, when an O-ring 54 is seated into o-ring groove 34A of wheel mounting member, a snug fit of axle cover 25A into chamber 36 in such a manner that the O-ring compresses as it is urged into the chamber and seats in o-ring groove 34A to snugly hold axle cover 25A on wheel mounting member 10A in such a fashion so that outer surface 26A is flush with the walls of axle receiving end 16 of wheel support 10B than are adjacent the wheel cover (see FIG. 3C). This gives a pleasing "flush-fit" clean appearance.

Likewise, wheel mounting member 10B contains an axle end chamber 36 machined to a diameter larger than the nut on the end of the axle and just slightly greater than ring 50 so that axle cover 25B can slide snugly into axle end chamber 36 to snugly engage walls 34 thereof to a depth sufficient to seat the base 48 flush with the walls of the outer surface. Insertably threading screw 46 into an appropriately drilled and threaded hole will allow contact between the removed end of the set screw against walls defining the set screw 50A to hold axle cover 25B in wheel mounting member 10B in a manner so that the outer surface 26B of the axle cover is flush with the walls of axle receiving end 16 that it is adjacent to when it is properly inserted thereon.

Figure 6A:
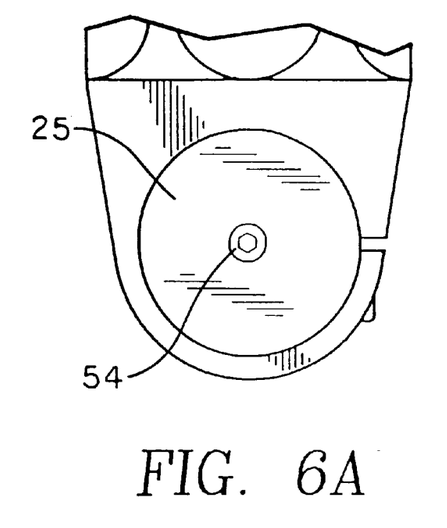
FIGS. 6A and 6B are front and outside elevational views of an alternate preferred embodiment of Applicant's present invention.
Figure 6B:
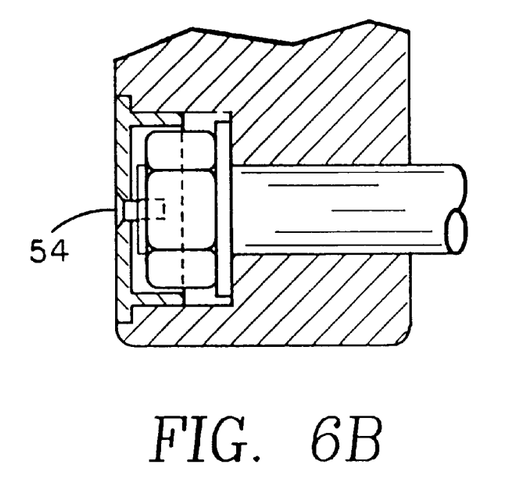

FIGS. 6A and 6B illustrate another alternate preferred embodiment of Applicant's present invention in which a screw 54 through the base of the wheel cover holds the axle cover 25 to the end of the axle which has a threaded bore 57 at the removed end thereof.

Figure 7A:
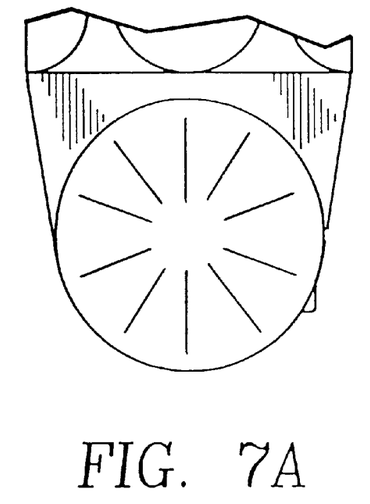
FIGS. 7A and 7B are front and outside elevational views of an alternate preferred embodiment of Applicant's present invention.
Figure 7B:
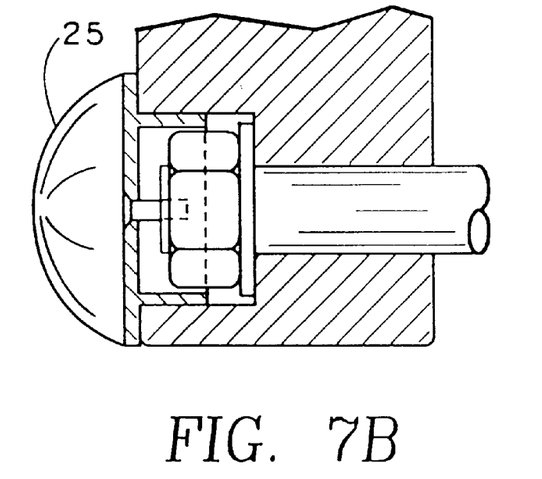

FIGS. 7A and 7B illustrate an alternate preferred embodiment of Applicant's invention which provides for fitting an axle cover 25 to the wheel mounting member so that the surface of the wheel cover meets the surface of the wheel mounting member in non-flush relation; here the wheel cover having a dome-shaped outer surface which provides a pleasing aesthetic effect. It is noted in FIG. 7 that the wheel cover may be held in place by a set screw (not shown), but may utilize on the other end thereof the o-ring connection. Indeed, in any of these embodiments, both sides could use the o-ring or both sides could use the set screws to fasten them to the wheel mounting member. Further, other fastening systems may be used, such as hook and loop or adhesive (such silicon adhesion) fasteners on the inside surface of the base to attach to a similar element fixed to the axle end.

Figure 8A:
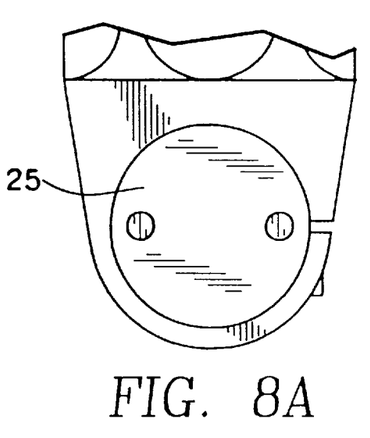
FIGS. 8A and 8B are front and outside elevational views of an alternate preferred embodiment of Applicant's present invention.
Figure 8B:
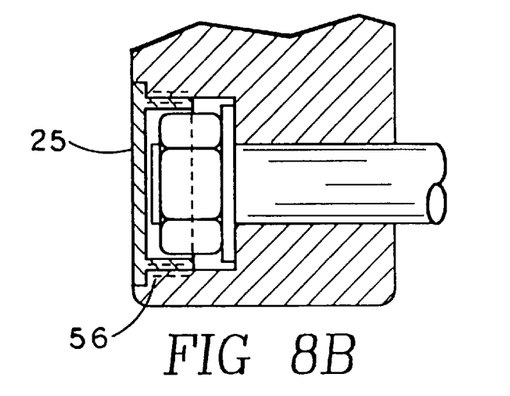

FIGS. 8A and 8B illustrate a means of fastening the wheel cover 25 to a member which consists of the outer surface of the ring of the wheel cover being threaded to engage threaded walls 56 on the inside of the axle chamber. A pair of pin drive holes 56 are provided to screw the wheel cover into the threads of the wheel mounting member.

Figure 9A:
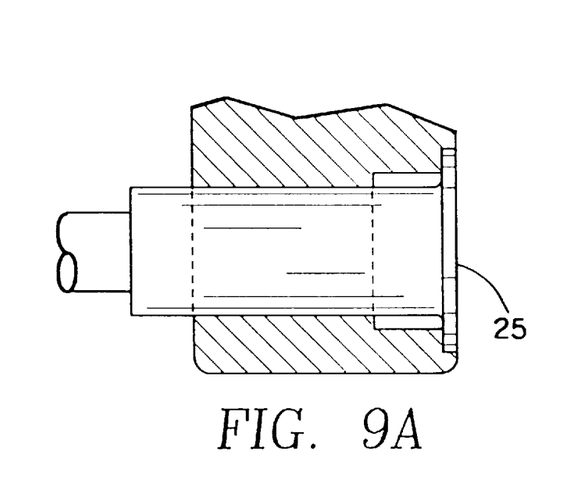
FIGS. 9A and 9B are front and outside elevational views of an alternate preferred embodiment of Applicant's present invention.
Figure 9B:
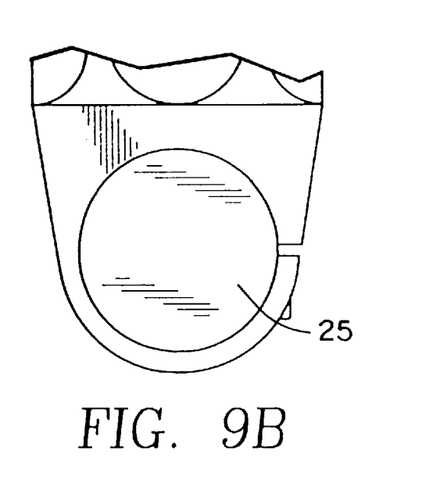

FIGS. 9A and 9B illustrate a wheel cover 25 integrated into a first end of the axle for flush engagement with the walls of the wheel mounting member. When this alternate preferred embodiment is used, no attachment means is necessary other than the slot and pinch bolts already present to hold the axle in place.

Figure 10:
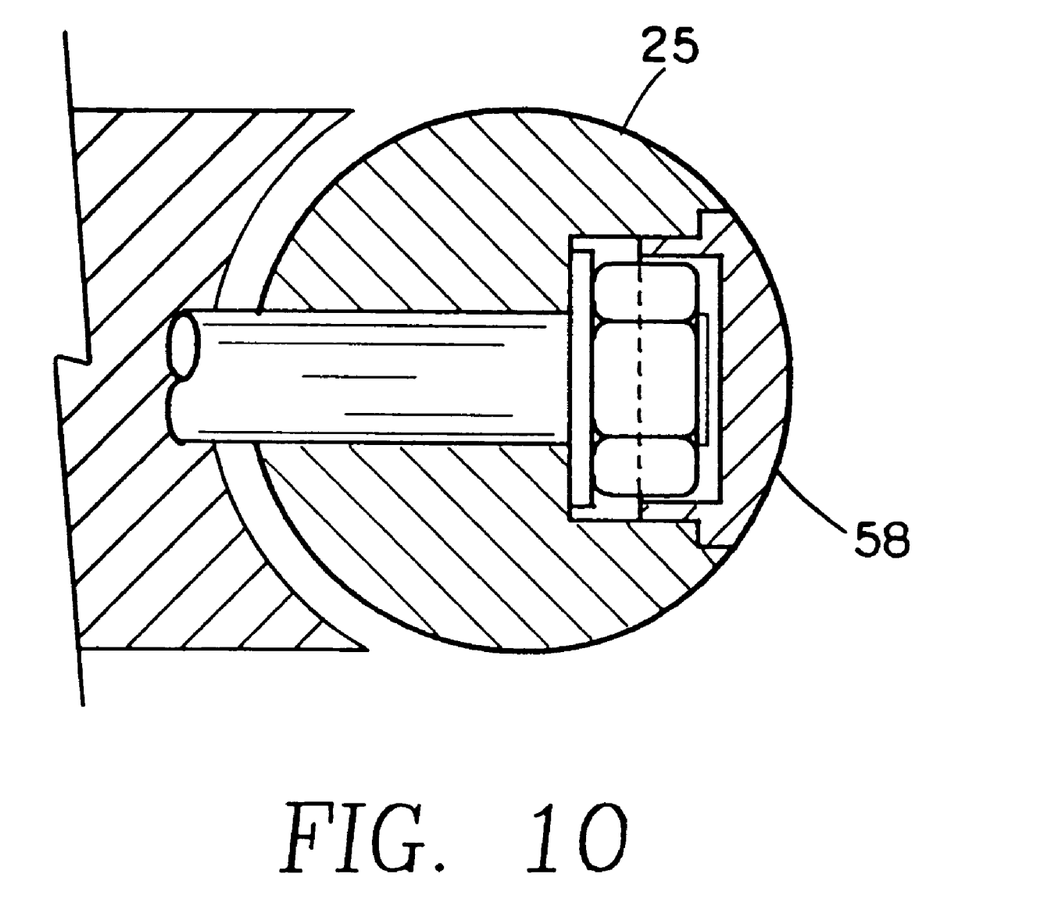
FIG. 10 is a cut-away side elevational side of an alternate preferred embodiment of Applicant's present invention.

FIG. 10 illustrates the use of an alternate preferred embodiment of wheel cover 25, which includes a cap 58 engageable therewith, which joins the wheel mounting member in a non-flush manner to provide a aesthetic curve to the surface of the wheel mounting member. Again, attachment may be in a number of means previously disclosed.

Applicant's present invention also includes use of a single axle cap on one side where nut and bolt are used to hold an axle in place, where the other end of the axle is not enlarged, but is flat and flush with the flat outer surface of a wheel mounting member. Applicant's present invention also anticipates the use of wheel covers in which tongs, rubber stubs, or other means, off the disc or outer surface of the wheel cover to engage either the axle, axle bolt or walls defining an axle chamber.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A device for engagement with a pair of motorcycle front suspension forks, each of the forks having a lower tube, the device comprising:

a first axle having a first and a second end;

a first mounting member, the mounting member having a lower tube engaging end and an axle receiving end, the axle receiving end with walls defining an axle receiving bore and walls defining an axle end chamber, the axle receiving bore for receipt of the axle therethrough, the axle end chamber dimensioned for receipt of the first end of the axle;

a second mounting member, the second mounting member having a lower tube engaging end and an axle receiving end, the axle receiving end with walls defining an axle receiving bore and walls defining an axle end chamber, the axle receiving bore for receipt of the axle therethrough, the axle end chamber dimensioned for receipt of the second end of the axle thereinto;

a first axle cover including an outer surface and means for engaging the walls of the axle end chamber of the first mounting member to attach the first axle cover thereto and to conceal from view the first end of the axle; a second axle cover for engaging the walls defining the axle end chamber to conceal from view the second end of the axle; wherein the first mounting member includes an outer surface and wherein the outer surface of the first axle cover forms a continuous plane with the outer surface of the wheel mounting member; and wherein the second wheel mounting member includes an outer surface and wherein the outer surface of the second axle cover forms a continuous plane with the outer surface of the wheel mounting member.

2. The device of claim 1 wherein the means for engaging the walls of the axle end chamber of the first mounting member includes an o-ring for engaging the walls of the first axle cover and the walls of the axle and chamber of the first mounting member.

3. The device of claim 1 wherein the means for engaging the walls of the axle end chamber of the first mounting member includes a set screw, dimensioned for threadable receipt into the first mounting member for engaging, when threadably inserted thereinto, the first axle cover.

4. A wheel axle cover system for use with a front suspension fork end of a motorcycle, the front suspension fork end for holding a axle in place, the wheel axle cover system comprising:

a wheel axle cover with walls defining an outer surface thereof, the outer surface visible when the wheel axle cover is engaged with either of the front suspension fork end or the axle of the motorcycle;

means for engagement of the wheel axle cover with either of the front suspension fork end or the axle in a manner which conceals the axle end from view; wherein the walls of the outer surface of the wheel axle cover meet the walls of the outer surface of the front suspension fork end and are part of a continuous plane.

5. The wheel axle cover system of claim 4 wherein the engagement means include an o-ring for engaging walls of the wheel axle cover and the front suspension fork ends.

6. The wheel axle cover system of claim 4 wherein the engagement means include a set screw for threadable insertion into the front suspension fork end in a manner that will compressible engage the set screw with the wheel axle cover.

7. The wheel axle cover system of claim 4 wherein the front suspension fork end engagement means includes walls defining a threaded portion, the engagement means including walls defining a threaded portion of the wheel axle cover, the walls for threadable engagement with the front suspension fork end to hold the wheel axle cover in place on the front suspension fork end.

8. The wheel axle cover of claim 4 wherein the front suspension fork end includes a slot therein and pinch bolts engageable with the slot wherein the engagement means of the wheel axle cover includes walls defining an inner surface, the inner surface engageable with the walls of the front suspension fork so that engagement of the pinch bolts through the slot compress the front suspension fork end against the walls of the inner surface of the wheel axle cover.

9. The wheel axle cover of claim 4 wherein the engagement means includes a screw for engagement with the wheel axle cover, and for engaging either of the axle or the front suspension fork end.

\* \* \* \* \*